P. MEEHAN.
GAS CLEANER.
APPLICATION FILED MAY 10, 1909.
955,651.
Patented Apr. 19, 1910.
4 SHEETS—SHEET 4.
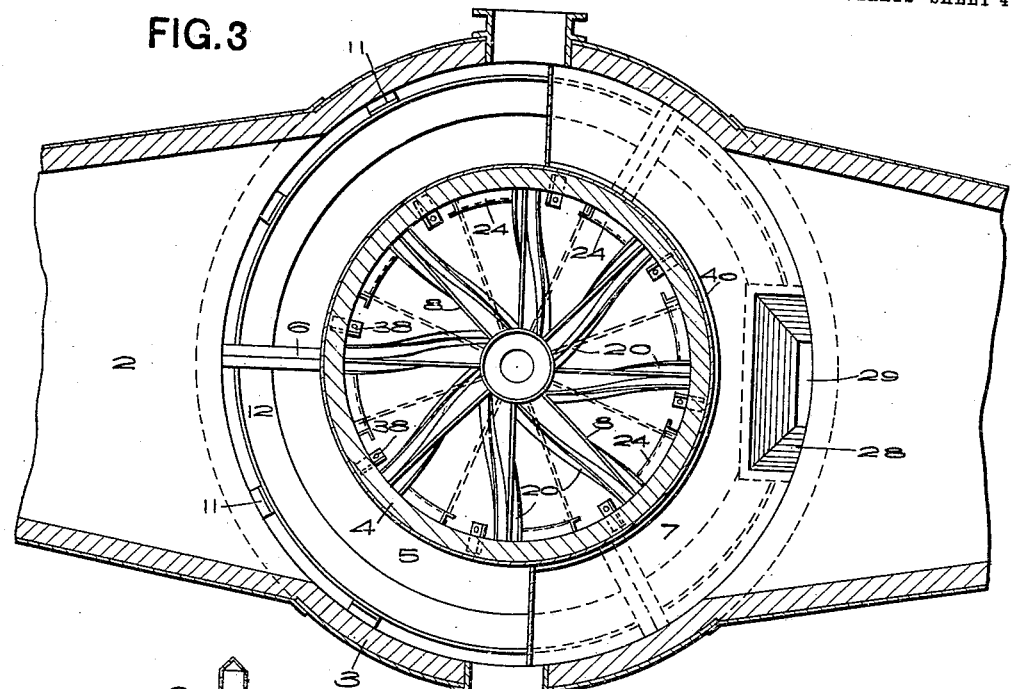
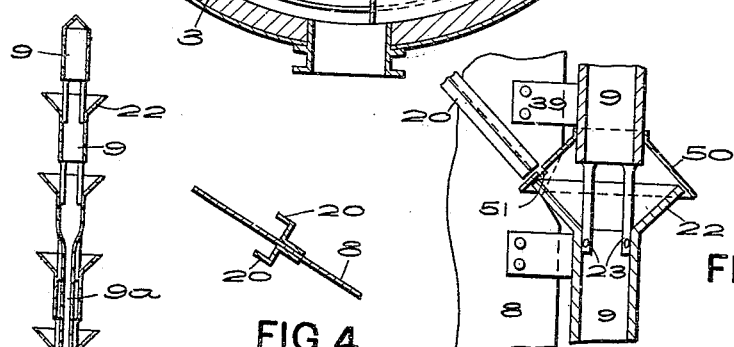
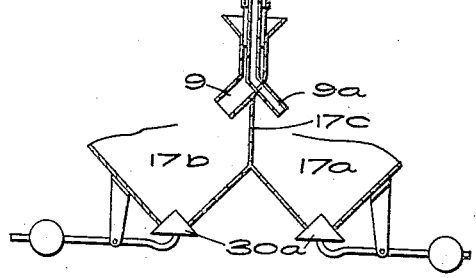
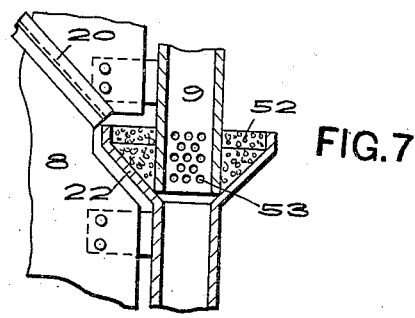
WITNESSES
INVENTOR

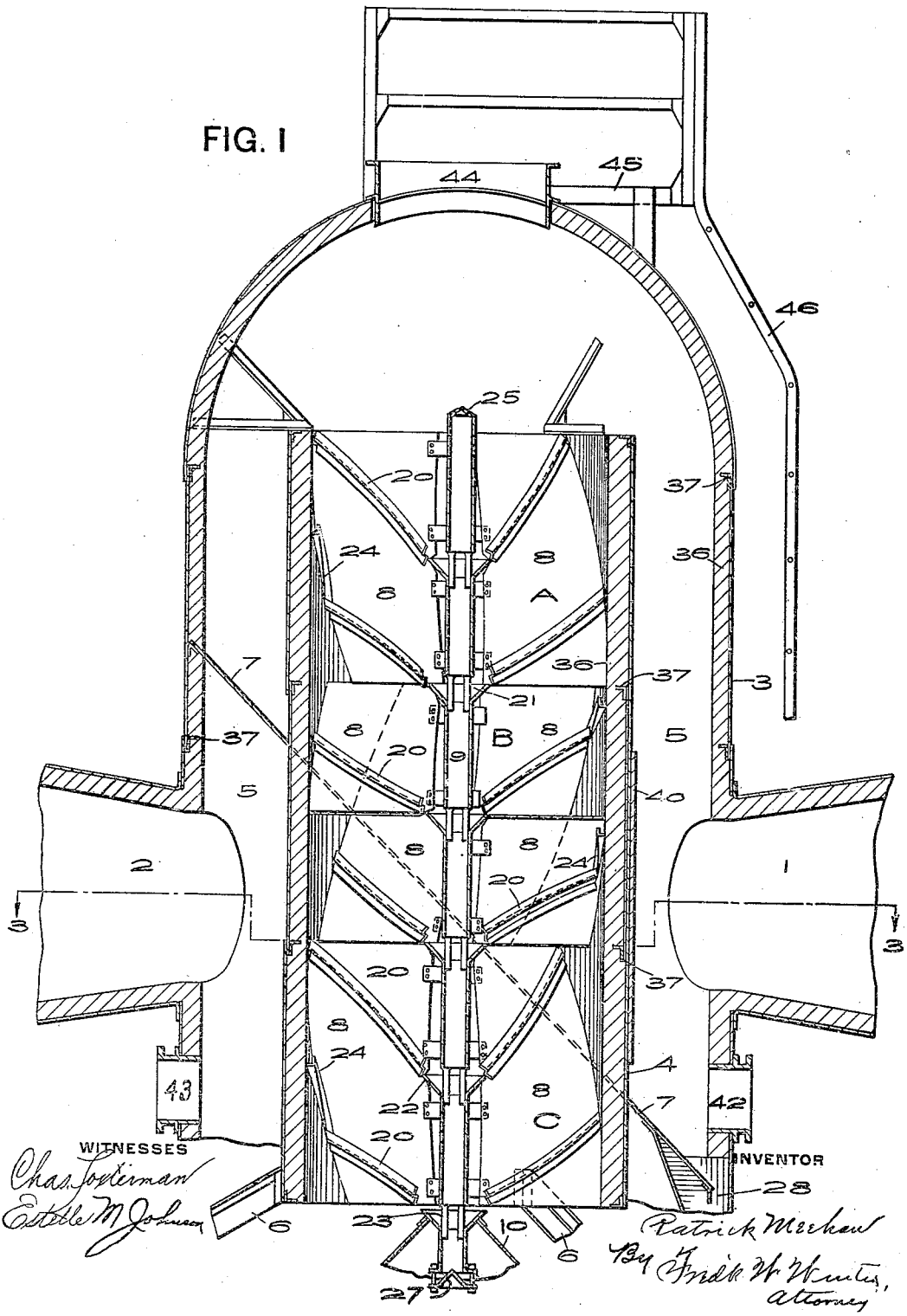

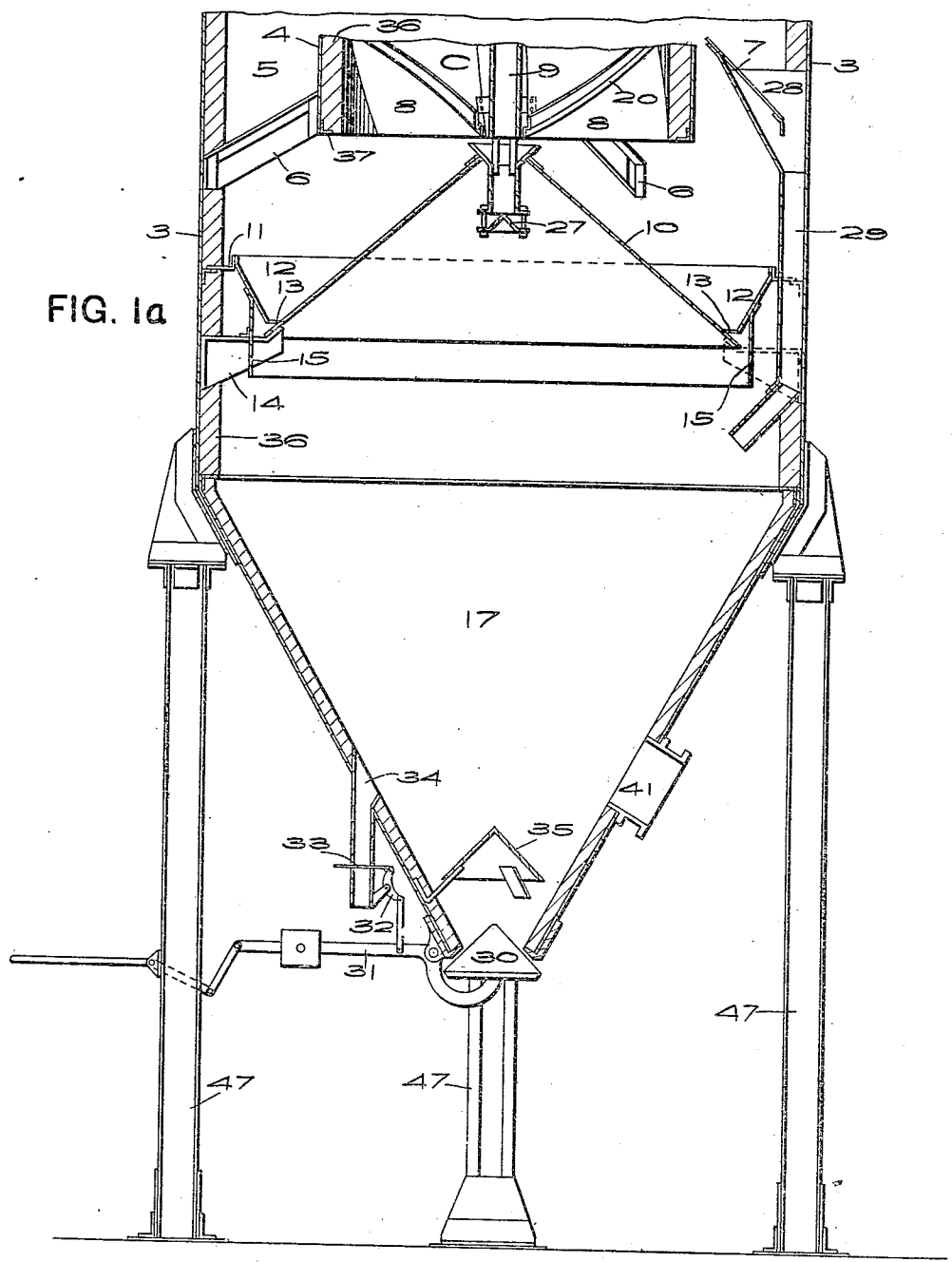

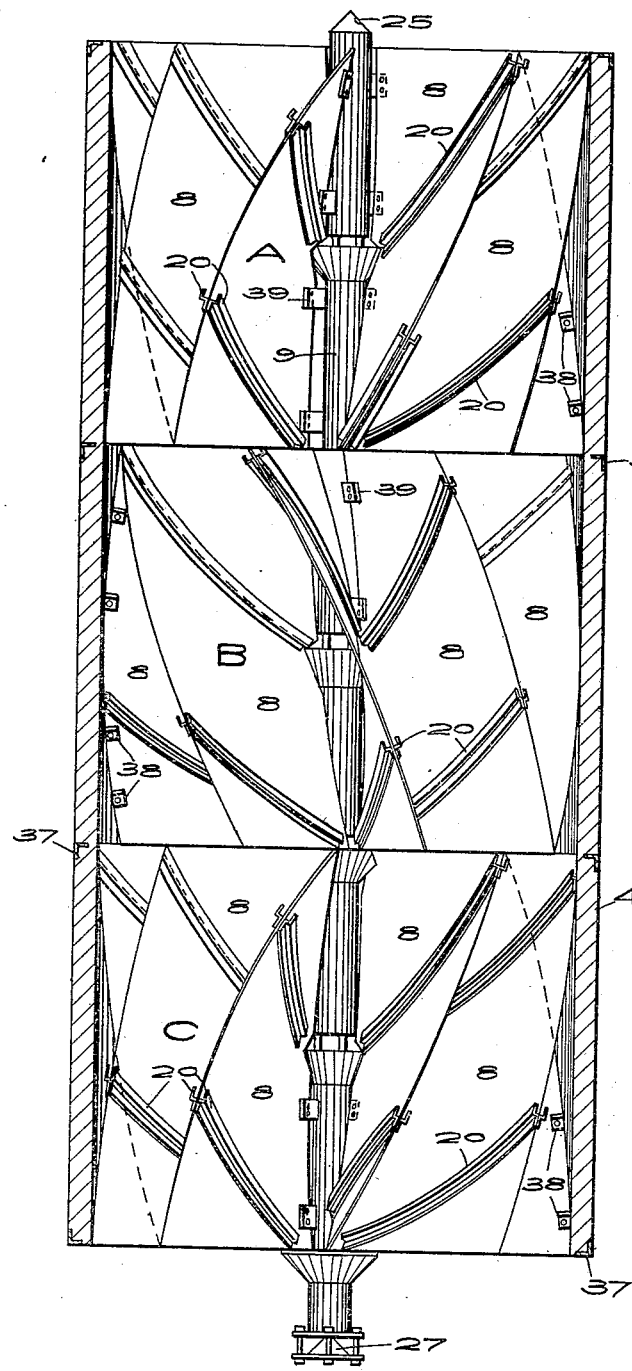

UNITED STATES PATENT OFFICE.

PATRICK MEEHAN, OF LOWELLVILLE, OHIO.

GAS-CLEANER.

955,651.  Specification of Letters Patent.  Patented Apr. 19, 1910.

Application filed May 10, 1909. Serial No. 494,995.

*To all whom it may concern:*

Be it known that I, PATRICK MEEHAN, a resident of Lowellville, in the county of Mahoning and State of Ohio, have invented a new and useful Improvement in Gas-Cleaners, of which the following is a specification.

This invention relates to gas cleaners, and more particularly to apparatus for cleaning blast furnace gases.

The object of the invention is to provide a dry gas cleaner, that is one in which no water is used, and which will thoroughly remove from the gas all dust and other solid matter, as well as moisture and other impurities.

Gas is ordinarily cleaned by means of washers, that is, apparatus through which the gas is passed and in which it comes in contact with or passes through water, which washes out the dust and other impurities. In some localities washers are objectionable on account of draining into streams and polluting the same with the wash water which carry highly injurious impurities. Furthermore, the water necessary to operate such washers is a serious problem in certain localities where water is scarce, and power is, of course, necessary to circulate the water, and there is also more or less leakage which makes the surroundings wet and sloppy.

By my invention all of the above difficulties are overcome since the gas is cleaned entirely by a dry process, and without the use of any water whatsoever.

The invention consists in the construction, arrangement and combination of parts hereinafter described and claimed.

In the accompanying drawings Figures 1 and 1ª show a vertical section of the improved gas cleaner; Fig. 2 shows a part of Fig. 1 on an enlarged scale; Fig. 3 is a horizontal section taken on lines 3—3, Fig. 1; Fig. 4 is a vertical sectional view through a baffle plate taken transversely of the gutters or ledges thereon; Fig. 5 is a horizontal section through the inner shell taken transversely of one of the dust collecting ledges therein; Fig. 6 is a vertical section on an enlarged scale showing the central dust collecting tube and connected parts; Fig. 7 is a similar view showing a modification; and Fig. 8 is a vertical sectional view of a portion of the apparatus showing a modified form of central dust collecting tube with a plurality of hoppers.

The apparatus operates upon the principle of beating the dust and other impurities out of the gas, this being effected by causing the gas to strike against baffle plates whereby the moisture, dust and other solid matter drops on the plates, and providing in connection therewith suitable means for conducting the dust gathered on the surfaces of said plates to a suitable dust collector.

As shown in the drawings the gas enters the apparatus through opening 1 in one side and leaves by opening 2 in the opposite side of the casing or shell 3. In this casing or shell is a central shell 4 open at top and bottom and projecting above and below the inlet and outlet openings and surrounded by the annular chamber 5 which has free communication with the interior of shell 4 at both ends of the latter. The shell 4 is supported from the outer shell 3 by brackets 6 or other means which does not interfere with the flow of the gas in the annular chamber 5. The annular chamber 5 is divided by a sloping plate 7 into an upper or inlet portion and a lower or outlet portion. The gas entering at 1 strikes against plate 7 and must flow upwardly in chamber 5, thence down through the shell 4, out of the lower end thereof and again up through the lower part of the annular chamber 5 to the outlet opening 2. In the chamber of the central shell 4 are arranged a comparatively large number of baffle plates 8. Preferably these plates are spiral plates having a downward slant and circling around a central dust collecting conduit or tube 9. The spiral plates 8 may be of any desired number, eight such plates being shown in the cross-section. These plates start at practically the same level, each having the spiral downward trend. Preferably there are a plurality of series of plates, each series below the next preceding, with the beginning ends of the plates of one series dividing the spaces between the lower ends of the preceding series. As shown there are three series of such spiral plates, namely, a top series A, an intermediate series B, and a lower series C, with the upper ends of plates B dividing the spaces between the lower ends of adjacent plates in series A, and with the upper ends of the plates in series C. In addition the middle series of plates B extend around the central dust tube in the opposite direction from that in which the upper series A and lower series C of plates extend, so that the direction of flow of the gas is abruptly changed at two points, likewise dividing the spaces between the lower ends of plates in series B. In this way the streams of gas passing between the plates of series A will be split by the plates of series B, and these streams in turn will be split by the plates in series C, thus getting a considerable breaking up of the streams of gas and insuring practically all portions of the gas coming into contact with these plates.

Below the open lower end of shell 4 is a stationary cone 10 having its apex surrounding the central dust flue 9 and projecting out toward the walls of the outer shell 3. Suspended from the outer shell on brackets 11 is a circular or annular plate 12 whose upper edge is slightly spaced from the outer shell and which projects downwardly and slightly inwardly with its lower edge in close proximity to the face of the cone 10 near the outer edge of the latter. A small space 13 is left between the lower edge of this annular plate 12 and the face of the cone, through which space any dust or solid matter falling on cone 10 and plate 12 will pass. The cone 10 is supported by brackets 14 projecting inwardly from the outer shell, and the plate 12 is also supported from said brackets by means of the annular guard plate 15 which is secured to and extends downwardly from the plate 12 a considerable distance below the cone, so that the dust passing down through the space 13 is guided downwardly. The brackets 11 project inwardly sufficiently far to leave a space between the shell and the plate 12 for the escape of any gas which may pass down into the dust hopper 17 which is below the cone 10.

The spiral plates 8 are provided with projecting ribs, ledges or the like 20, which preferably are shaped so as to form gutters and which extend diagonally across said plates so that they have a downward pitch and at their lower ends communicate with openings 21 in the central dust flue 9. The openings 21 may be formed in any way, and shown are formed by making the tube 9 in sections with flaring upper ends 22 with the lower end of the next above section spaced therefrom and secured by straps 23. The ledges or gutters 20 are arranged every few feet apart and serve to collect the dust which falls down on the plates and direct the same into the tube 9. These ledges or gutters are provided on the top and also on the bottom surfaces of the plates, so that they gather the dust on both sides of the stream of gas flowing between the plates. Preferably also the side walls of the chamber in shell 4 have ledges or gutters 24 thereon whose ends communicate with the outer ends of the gutters 20, so that the dust taken out of the gas by striking the side walls of the chamber is thereby directed to the tube 9. The tube 9 has its upper end closed except as to a relief vent 25, and its lower end extends down through the cone 10. On its lower end is held a cone-shaped deflector 27 which is of greater diameter than said tube and leaves only a narrow space between itself and the same, through which the dust drops into the hopper 17. This cone prevents a direct draft down through the tube.

The gas as it enters the cleaner strikes the inclined plate 7 and all dust and other impurities which are beaten out by this contact slide down said plate into the hopper 28 at the lower edge of said plate and are thence conducted by conduit 29 to the hopper 17. The hopper 17 is provided in its bottom with an opening which is controlled by a bell 30 or other suitable valve. The bell is carried by lever 31, and operatively connected to said lever is a bell crank lever 32 which is connected to an arm on a valve 33 controlling a small warning opening 34. When the bell 30 is opened the valve 33 is also opened. As soon as the level of the dust in the hopper falls below the opening 34 dust will cease to flow through the latter and this warns the operator to close the bell 30. This also closes the warning valve 33. A cone shaped deflector 35 is located just above the bell 30 and serves to prevent direct outflow of gas as well as inflow of air in case the bell 30 is not closed promptly by the operator.

Both the outer and inner shells are preferably lined with brick as shown at 36. To this end the shells are provided on their insides with annular angle bars 37 which form ledges for supporting the brick. These angle bars are arranged at short intervals vertically so that a portion of the lining can be removed and renewed without disturbing the whole. One of these angle bars on the outer shell serves as a support for the brackets 11, and for the plate 12. The spiral plates 8 can be supported upon suitable clips 38 connected to the angle bars in the shell 4 and clips 39 on the central dust tube 9. Preferably the spiral plates are castings, and the ledges 20 may be either formed integral therewith or as separate members riveted or bolted thereto. Opposite the inlet 1 the shell 4 is covered by removable wear plates 40 against which the gas strikes, and which can be replaced when worn.

In order to permit access to the interior of the cleaner a manhole 41 is provided below the cone 10 to give access to the hopper 17, another manhole 43 is provided above the cone 10 and below the plate 7, another manhole 42 is provided above the plate 7, and a manhole 44 is also provided at the top through which the plates 8 can be inserted and removed. A platform 45 is provided at the top manhole to permit working at this point and a ladder 46 extends to this platform. The cleaner is supported upon suitable columns 47 to support the bell 30 sufficiently high to permit the ready removal of the dust from the hopper.

In the use of the device for cleaning blast furnace gases the gas is first passed through a dust catcher and then conducted to the cleaner. In cleaning any kind of gas the latter enters through opening 1, spreading out in fan shape and striking against the inclined plate 7, thence flows upwardly to the upper end of shell 4, and then downwardly between the spiral plates 8 therein and escapes from the bottom of said shell above the cone 10, and thence upwardly through the space 5 to the outlet 2. The stream of gas as it enters the chamber above plate 7 and while flowing through the spiral baffle plates 8 constantly has its course altered so that it keeps continually striking against the sloping plate 7 and the spiral plates 8 both above and below the stream and also against the side walls of the chamber. This knocks down the dust or other impurities which are caught by the ledges or ribs and directed to the central tube 9 down which they drop into dust catcher or hopper 17. The gas in being spread outwardly at the bottom of shell 4 also strikes against the cone 10 and against the inclined annular plate 12 thereby having more dust beat out which escapes through the space 13 into the hopper. Since the hopper is sealed at its bottom there is no draft through the same and what little gas escapes down through the tube 9 and through the space 13 into the hopper must pass down below the guard plate 15 and then escapes upwardly through the space around the upper end of plate 12 where the latter is supported by the brackets 11 away from the wall of the shell. The heavier and larger impurities strike the inclined plate 7 and are thereby separated from the gas and fall down the conduit 29. This conduit may lead to the hopper 17 as shown, or to a separate hopper or collecting chamber. This is of importance in separating ore from what is known as "flue dust" from blast furnace gas, as such flue dust can be collected in a separate hopper for subsequent sintering or briqueting. The heavier particles of dust, of course, are first separated from the gas. Fig. 8 shows a modification in which the heavier and lighter portions of gas can be kept separate. In this arrangement, the two upper funnels 22 are connected to a small pipe $9^a$ which extends down centrally in the pipe 9 of the lower funnels, said central pipe opening at $9^a$ into one hopper $17^a$ while the pipe 9 opens into another hopper $17^b$. These hoppers are divided by a partition wall $17^c$ and each is controlled by a bell valve $30^a$. By this arrangement the dust is divided into a heavier and a lighter grade. To prevent the gas from passing directly down the central dust flue 9, the funnels 22 may be covered by a hood 50 as shown in Fig. 6, provided with openings registering with the dust collecting gutters 20. If it is desired to allow only liquid or fine particles to pass down the central flue, the arrangement of Fig. 7 may be used in which the lower end of one pipe section 9 projects down into the funnel so as to leave no space and is provided with perforations 53 acting as strainers. The funnel may also be filled with porous material shown at 52 to also act as a strainer. When it is desired to clean the hopper 17 the bell 30 is opened to allow the material to discharge therefrom. The hopper empties itself quickly so there is little escape of gas. The cone 27 at the lower end of tube 9 and the cone 35 above the bell prevent any direct strong draft when the bell is opened. The baffle plates in shell 4 are so numerous, and those of the several series are arranged so as to repeatedly split the streams of gas and change the direction of flow thereof, so that by the time the gas reaches the annular up take 3 all portions of the gas have come into contact with a plate or plates and the dust effectually beat out of the same. The gas is therefore thoroughly cleaned and without the use of any water whatsoever.

The cleaner described is strictly a dry cleaner and thereby overcomes all the objections of gas washers, namely the pollution of streams with the wash water; the difficulty of securing sufficient water in certain localities, the power necessary to pump or circulate the water, and the sloppy slushy conditions around gas washers.

The cleaner described is adapted to remove from the gas not only dust and solid matter, but also moisture, so that it acts also as a drier. In case the gas has been washed and is laden with moisture the apparatus described will act to extract the moisture therefrom, said moisture being collected by the baffles and troughs in the same manner as the dust. In such case the brick linings are not necessary. The apparatus may also be used as a dust catcher for all purposes where it is desired to free gases or air from dust but without necessarily afterward utilizing the air or gas. The term "gas cleaner" as herein used, and particularly in the claims is intended to cover the uses above named. The apparatus described is also adapted to condense the fumes from lead, zinc, silver, copper and other smelters, and to collect the fine particles of these metals and ores which generally escape to the atmosphere. The apparatus can be made of any height so as to effectively condense and collect the fumes and metallic particles, and collect the same in a suitable chamber. In case the apparatus is used to separate water from gas or collect and condense metallic fumes the brick lining would be omitted so as to cool and condense the water and fumes. In such case special cooling arrangements can also be supplied if necessary.

What I claim is:

1. A dry gas cleaner comprising a chamber provided with baffle plates for breaking up the stream of gas, a dust conduit, and ledges on the plates projecting from the faces thereof and leading to openings in the dust conduit.

2. A dry gas cleaner comprising a chamber provided with spiral baffle plates for breaking up the stream of gas, a dust conduit, and ledges on said plates leading to openings in the dust conduit.

3. A dry gas cleaner comprising a chamber provided with baffle plates for breaking up the stream of gas, a dust conduit, a collecting chamber to which said conduit connects, and troughs or gutters on said plates leading to openings in said dust conduit.

4. A dry gas cleaner comprising a chamber provided with spiral baffle plates for breaking up the stream of gas, a dust conduit, gutters on the plates leading to openings in the dust conduit, and ledges on the walls of the chamber leading to said gutters.

5. A dry gas cleaner comprising a chamber provided with an inlet at the top and outlet at the bottom, a plurality of sets of stationary spiral plates arranged in said chamber, the plates of successive sets arranged alternately with reference to each other, a dust collecting chamber, and means for conveying the dust from said spiral plates to said collecting chamber.

6. A dry gas cleaner comprising a chamber with an inlet at the top and outlet at the bottom, a plurality of sets of spiral plates therein, the plates of successive sets being arranged alternately with relation to each other, dust guides on said plates, and a dust conduit to which said guides lead.

7. A dry gas cleaner comprising a circular chamber provided with an inlet at the top and an outlet at the bottom, a centrally arranged dust conduit, spiral baffle plates in said chamber around said central conduit, and dust guides on said plates leading to openings in said dust conduit.

8. A dry gas cleaner comprising a circular chamber provided with an inlet at the top and an outlet at the bottom, a central dust conduit in said chamber, a plurality of sets of spiral plates in said chamber, the plates of successive sets being arranged alternately, and guides for the dust on said plates arranged to conduct the dust to openings in the central conduit.

9. A dry gas cleaner comprising a chamber with an inlet at the top and an outlet at the bottom, spiral baffle plates arranged in said chamber, dust guides arranged on both faces of said plates, and a dust conduit arranged to receive the dust from said guides.

10. A dry gas cleaner comprising a chamber provided with an inlet at the top and an outlet at the bottom, a central dust tube or conduit therein, spiral plates in said chamber, and dust guides projecting from both faces of said plates and leading to openings in the central dust tube.

11. A dry gas cleaner comprising a circular chamber provided with an inlet at top and an outlet at the bottom, spiral baffle plates in said chamber, a conical plate below said chamber, a dust chamber underneath said conical plate, an annular up take communicating with the lower end of said circular chamber, and a central dust conduit arranged to receive the dust from the spiral plates and extending down into the dust chamber.

12. A dry gas cleaner comprising an inner shell provided with an inlet at the top and open at its bottom, an outer shell surrounding said inner shell and providing an annular up take, a series of spiral baffle plates in the central downtake chamber, a cone arranged to divide said chambers from a lower dust collecting chamber and arranged to direct the dust into the latter, and a conduit arranged to receive the dust from each of the baffle plates and conduct it to the collecting chamber.

13. A dry gas cleaner comprising an inner shell provided with an inlet at the top and open at its bottom, as outer shell surrounding said inner shell and providing an annular uptake communicating with the lower end of the inner shell, baffle plates arranged in said inner shell, a cone shaped plate dividing the space in said shells from a lower dust collecting chamber, and a circular plate projecting from near the outer shell downwardly and inwardly into proximity to said cone.

14. A dry gas cleaner comprising an inner shell provided with an inlet at the top and open at the bottom, an outer shell surrounding said inner shell and providing an annular uptake, baffle plates in said inner shell, a cone at the lower end of the inner shell and dividing the space therein from a dust collecting chamber, an annular plate projecting from near the outer shell inwardly toward said cone, and an annular vertical baffle plate extending from said last named plate downwardly and spaced from the outer shell.

15. A dry gas cleaner comprising a vertical chamber provided with an inlet to its upper end and at its lower end communicating with an annular uptake, a dust tube arranged centrally in said chamber, baffle plates in said chamber, means on said plates for guiding the dust to said dust tube, and a dust collecting chamber into which the lower end of said dust tube projects, said dust tube at its lower end being provided with a deflector.

16. In a dry gas cleaner, the combination of an inner shell provided with an inlet at the top and an outlet at the bottom, an outer shell surrounding the inner shell and providing an annular uptake, a plurality of oppositely arranged baffle plates in said inner shell, a dust conduit arranged to receive the dust from said plates, and an outlet from the outer shell above the lower end of the inner shell.

17. A dry gas cleaner comprising an inner shell provided with an inlet at the top and open at its bottom, an outer shell surrounding said inner shell to provide an annular chamber, baffle plates and dust collectors in said inner shell, an inclined plate separating the annular chamber between the upper and lower ends of the inner shell, an inlet above the inclined plate on its lower side, and an outlet below said inclined plate on its higher side.

18. A dry gas cleaner comprising an inner shell provided with an inlet at the top and open at its bottom, an outer shell surrounding said inner shell to provide an annular chamber, baffle plates and dust collectors in said inner shell, an inclined plate separating the annular chamber between the upper and lower ends of the inner shell, an inlet above the inclined plate on its lower side, an outlet below said inclined plate on its higher side, and a conduit from the lower edge of said inclined plate to a dust collector.

In testimony whereof, I have hereunto set my hand.

PATRICK MEEHAN.

Witnesses:
F. W. WINTER,
M. K. DRAPER.